United States Patent [19]

Switsen

[11] 3,710,185

[45] Jan. 9, 1973

[54] FLASHER CIRCUIT

[76] Inventor: Henry N. Switsen, 2319 Montrose Drive, Thousand Oaks, Calif. 91360

[22] Filed: June 7, 1971

[21] Appl. No.: 146,568

[52] U.S. Cl. ...........315/240, 315/200 A, 315/DIG. 4

[51] Int. Cl. ...............................................H05b 37/00

[58] Field of Search .....307/252.90, 305; 315/72, 74, 315/75, 209, 240, 100 F, 200 A; 340/331

[56] References Cited

UNITED STATES PATENTS

| | | | |
|---|---|---|---|
| 3,310,687 | 3/1967 | Howell | 315/72 X |
| 3,377,125 | 4/1968 | Zielinski | 307/252.90 |
| 3,466,502 | 9/1969 | Pinckaers | 307/252.90 |

OTHER PUBLICATIONS

J. H. Galloway, "Using the Triac for Control of AC Power," General Electric Application Note, No. 200.35, 3/66, pp.1–20.

*Primary Examiner*—Roy Lake
*Assistant Examiner*—Lawrence J. Dahl
*Attorney*—Lindenberg, Freilich & Wasserman

[57] ABSTRACT

A circuit which can be connected in a fluorescent lamp fixture in place of the starter, to create a bright, psychedelic flashing effect. The circuit includes a silicon controlled rectifier (SCR) that is turned on by a timing circuit once in every several cycles of the A.C. source to clamp the voltage across the fluorescent lamp to a low level so that the lamp cannot light. The timing circuit preferably operates the SCR a minority of the time so that the lamp is on most of the time to provide a high average illumination level, and the timing circuit preferably operates the SCR to turn off the lamp at rate of at least 5 times per second so that the sensed effect is similar to that of a bright light flashed on for a brief time rather than a moderate intensity light that is turned off for a brief time. The timing circuit includes a diode, resistor, and timing capacitor connected in series across the lamp terminals, and a diac or neon tube connected across the capacitor and to the gate of the SCR to discharge the capacitor and turn on the SCR once in every several cycles of the A.C. source.

5 Claims, 6 Drawing Figures

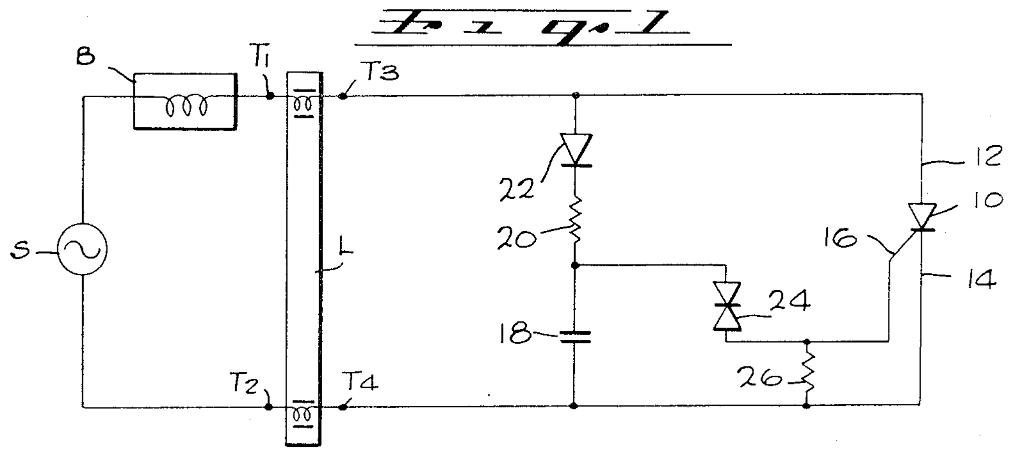
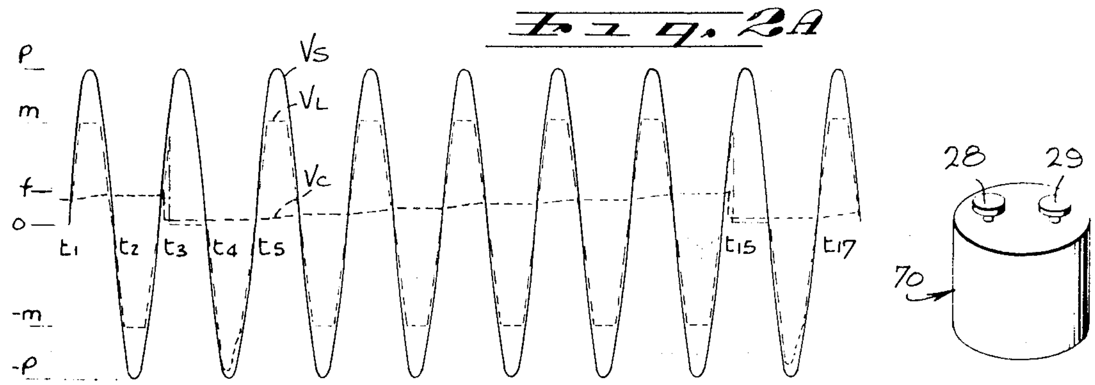
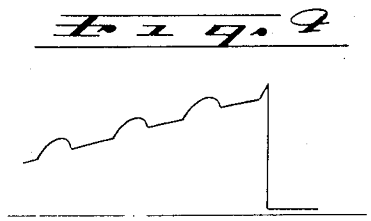
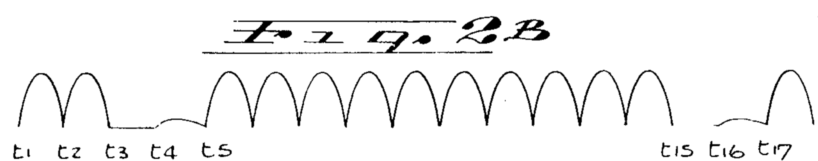
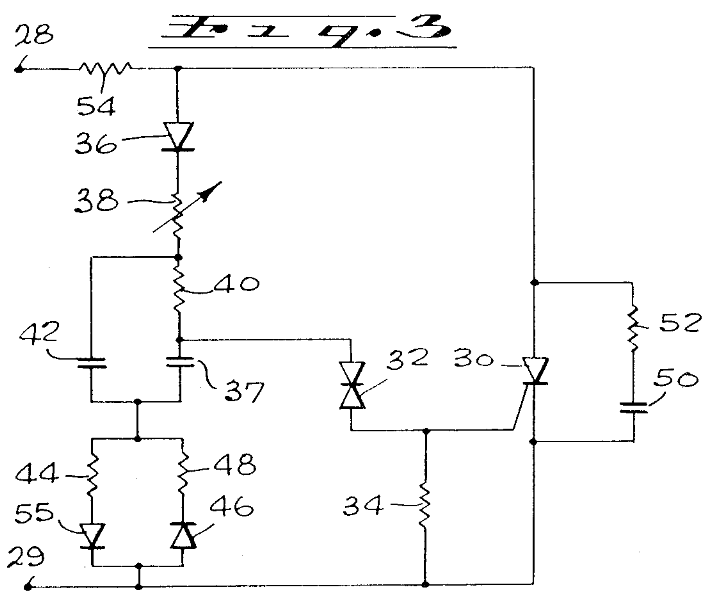
Fig. 4
HENRY N. SWITSEN
INVENTOR.
BY
Lindenberg Freilich & Wasserman
ATTORNEYS

FLASHER CIRCUIT

BACKGROUND OF THE INVENTION

This invention relates to light controlling apparatus and more particularly to apparatus for flashing a lamp.

Flashing lights are often used to provide an entertaining effect, this often being referred to as a psychedelic effect. Stroboscopic lamps, conventionally used to provide brief high intensity flashes in high speed photography and machinery analysis, have found extensive use in providing psychedelic effects. The lamps provide a very brief flash, but one which is of high enough intensity to create a moderate average illumination when the lamps are flashed on at a rate such as several times per second. High intensity stroboscopic lamps have been used in psychedelic lighting to provide a high enough average illumination to permit persons to easily see posters and the like. While stroboscopic lamps have been widely used, they add considerable expense to the lighting of a room inasmuch as the lamps and circuitry for energizing them are costly, and the cost is in addition to normal non-flashing illumination which is often provided to illuminate the room when a psychedelic effect is not desired.

SUMMARY OF THE INVENTION

In accordance with the present invention, apparatus is provided which can flash off an ordinary lamp to create a psychedelic effect. In one embodiment of the invention, a flashing circuit is provided which can be installed in place of an ordinary fluorescent lamp starter to repetetively flash off the fluorescent lamp. The flasher circuit includes a silicon controlled rectifier (SCR) with its anode and cathode terminals connected across the lamp terminals, so that when the SCR is conducting it prevents the maintenance of a large voltage across the lamp and therefore keeps it off. A timing circuit is utilized to turn on the SCR once in every several cycles of the A.C. source that energizes the lamp. The timing circuit includes a capacitor, resistor and diode connected in series across the lamp terminals so that the capacitor charges to a progressively higher voltage at every positive half cycle of the A.C. source. A diac is connected across the capacitor through the gate-to-cathode portion of the SCR so that when the capacitor reaches the breakdown voltage of the diac, the capacitor is discharged through the diac and gate-to-cathode portion of the SCR. The current raises the voltage at the gate of the SCR and turns it on.

The capacitor-charging resistor of the timing circuit may be chosen that is small enough to permit charging of the capacitor to the diac breakdown voltage in a short time such as less than one-fifth of a second, so that the lamp flashes off at a frequency of at least 5 times per second. At a frequency of about 5 cps or higher, the fact that the lamp may be on most of the time and turned off for a minority of the time does not seriously affect the psychedelic effect sensed by people. The capacitor-charging resistor is large enough to provide enough time between blackouts of the lamp that the lamp is on for a majority of the time, thereby providing a relatively high average illumination.

The novel features of the invention are set forth with particularity in the appended claims. The invention will best be understood from the following description when read in conjunction with the accompanying drawings.

BRIEF DESCRIPTION OF THE DRAWINGS

FIG. 1 is a schematic view of a flasher circuit constructed in accordance with one embodiment of the invention, showing its manner of connection in a fluorescent lamp circuit;

FIG. 2A illustrates wave forms of voltages in the circuit of FIG. 1;

FIG. 2B is a graph that indicates the variation in light with time, of the lamp controlled by the circuit of FIG. 1;

FIG. 3 is a schematic diagram of a flasher circuit constructed in accordance with another embodiment of the invention;

FIG. 4 illustrates the voltage applied across the diac element in the circuit of FIG. 3; and FIG. 5 illustrates a case for a flasher circuit which can be installed in place of an ordinary starter.

DESCRIPTION OF THE PREFERRED EMBODIMENTS

FIG. 1 illustrates a fluorescent lamp L with two terminals $T_1$, $T_2$ connected to an A.C. source S through an inductor or ballast B. The voltage source S may be a household type such as one which supplies a nominal 110 volts (with a peak voltage of about 150 volts) at a frequency such as 60 cycles per second, although an auto transformer or the like may be incorporated in the ballast B to boost the voltage in certain lamp applications. The lamp also has another set of terminals $T_3$ and $T_4$ which are normally connected to a starter. The starter can initially provide a conductive path between the terminals $T_3$ and $T_4$ to heat the lamp filaments, and then the conductive path can be opened so that the inductive ballast B provides a large current pulse through the lamp to start it. The lamp L thereafter provides apparently continuous illumination, the illumination falling during brief and unnoticed periods in each cycle of the A.C. source S when the voltage supplied by the source decreases below the level required to keep the lamp on.

In accordance with the present invention, a flasher circuit is connected across the starter terminals $T_3$ and $T_4$ to turn off the lamp once in every several cycles of the A.C. source S, the lamp turning off for a long enough period so that the effect is readily noticeable. The circuit includes a silicon controlled rectifier (SCR) 10 with two main terminals consisting of an anode 12 and cathode 14, and a control terminal consisting of a gate 16. The main terminals 12, 14 are connected across the lamp terminals $T_3$ and $T_4$, so when the SCR 10 is turned on the voltage across the lamp terminals is firmly maintained or clamped, to a low level such as on the order of 1 volt. In order for the lamp to remain lit, a voltage such as 100 volts must be maintained across its terminals $T_3$ and $T_4$, so that when the SCR 10 is conducting the lamp is off.

The SCR 10 is turned on only once in every several cycles of the A.C. source S, so that the lamp can remain lit most of the time. Once in every several cycles, timing circuitry of the flasher apparatus applies a voltage to the gate 16 of the SCR to turn on the SCR. The SCR 10 is turned on when a positive voltage such as 0.7 volts is applied between the gate 16 and cathode 14. The timing circuitry, which provides such a voltage once in every several A.C. cycles, includes a timing capacitor 18, timing resistor 20 and diode 22. The capacitor, resistor, and diode are connected in series across the lamp terminals $T_3$ and $T_4$ to charge the capacitor to progressively higher voltages.

A diac 24 is connected through the gate terminal 16 and the cathode of the SCR across the timing capacitor 18. A diac is characterized by the fact that it has a very high resistance between its terminals until a predetermined breakdown voltage is applied between its terminals. The diac then breaks down to provide a low resistance between its terminals even when the voltage falls to a low level. For example, a diac may have a very high resistance between its terminals until a voltage such as 30 volts is impressed across the terminals, the diac then becoming highly conductive so long as a minimum current is applied which maintains a voltage across the diac. However, when the minimum current or voltage is no longer present, the diac returns to its original state wherein it provides a very high resistance until the initial breakdown voltage is again applied. A diac acts in much the same way as a neon tube, although neon tubes often require a higher breakdown voltage such as 75 volts, may have a higher resistance than a typical diac after breakdown, and may return to their original state when the voltage across its terminals drops below a level such as 40 volts. However, diacs, neon tubes and other devices which operate in a similar manner may all be referred to as diac means or firing means.

The circuit of FIG. 1 may be best understood by considering its operation during a complete cycle of operation that extends over several cycles of the A.C. source S. During the period when the SCR 10 is off, a large alternating current is applied across the lamp terminals $T_3$ and $T_4$. During the positive half of each A.C. cycle, current can flow through the diode 22 and resistor 20 to charge the capacitor 18 and increase the voltage thereacross. During each positive half cycle, the voltage across the capacitor 18 increases until a time is reached when the voltage across the capacitor equals the breakdown voltage of the diac 24. When this voltage is reached, the diac 24 suddenly becomes conductive so that the capacitor 18 can rapidly discharge, through the diac and gate terminal 16 and the cathode, back to a low level.

As a capacitor-discharging current flows through the gate 16, the voltage at the gate rises to a level above the cathode 14 of the SCR. If there is a positive voltage across the main terminals 12, 14 of the SCR 10, then it will turn on and provide a very low resistance between its main terminals and thus between the lamp terminals $T_3$ and $T_4$. This prevents the maintenance of a high enough voltage across the lamp terminals to keep the lamp lit and the lamp is therefore turned off. The SCR 10 remains turned on so long as an appreciable positive voltage is supplied across the lamp terminals $T_3$ and $T_4$. However, at the beginning of the negative half cycle of the A.C. source S, the voltage measured from $T_3$ to $T_4$ goes negative and the SCR 10 turns off and will not turn on again until the next time that the capacitor 18 discharges through the diac 24, which requires several more cycles of the A.C. source S.

When the lamp L has been turned off by the SCR 10, and the A.C. source begins to apply a negative voltage across the lamp terminals, as measured from $T_3$ to $T_4$, the lamp is not prevented from turning on again. However, it may require an additional half cycle before the lamp is fully turned on. Accordingly, the lamp may turn off for substantially an entire cycle of the A.C. source every time the diac 24 is fired. In the case of a 60 cycle per second A.C. source, the lamp may remain off for a period on the order of a sixtieth of a second, which is sufficient to provide a noticeable blackout or off-flash. The value of the timing resistor 20 is chosen, with respect to the timing capacitor 18, so that the capacitor 18 charges back to the breakdown voltage of the diac only after a desired number of cycles of the A.C. source. In many cases it is desirable to provide a low enough resistance at resistor 20 so that the lamp flashes off at a frequency of at least about 5 cycles per second. At a rate this high or higher, persons generally cannot easily determine whether the lamp has flashed on briefly or flashed off briefly, and the effect is largely similar to that of a high intensity lamp cyclically flashing on for a brief time, at least in creating a psychedelic mood or atmosphere. The rate of off-flashing should be less than about 30 times per second to create a psychedelic effect, because otherwise the flashing, whether on or off, will not be noticeable. Of course, the resistance 20 can be made low enough to turn off the lamp at every other cycle, but this reduces the average light intensity somewhat. It is also possible to make the resistance 20 larger to provide an off-flash less often than every fifth of a second, where the resultant effect is desired as in calling attention to a sign.

FIG. 2A illustrates the wave forms of voltages present in the circuit of FIG. 1, the wave form shows the voltage $V_s$ supplied by the voltage source S, the wave form $V_L$ illustrates the voltage across the lamp L as measured between the terminals $T_3$ and $T_4$, while the wave form $V_c$ illustrates the voltage across the capacitor 18. The wave forms are shown for a circuit that flashes off the fluorescent lamp once in every 6 A.C. cycles, so that for a 60 cycle source the lamp flashes off at 10 cycles per second. As the source voltage $V_s$ begins rising at the time $t_1$, the lamp voltage $V_L$ follows it until the voltage $m$ is reached, the lamp then preventing a voltage exceeding $m$ across its terminals. Near the time $t_2$, when the source voltage falls and starts to become negative, the lamp is off, but it again turns on as the source impresses a large negative voltage across the lamp up to a time near $t_3$. FIG. 2B indicates the light output from the lamp, showing the large output up to the time $t_3$.

Up to the time $t_3$, the voltage $V_c$ across the timing capacitor 18 progressively charges to higher levels. A short time after $t_3$, the capacitor attains the breakdown or firing voltage $f$ of the diac 24. The diac then fires to discharge the capacitor so that its voltage $V_c$ drops to a low level. The capacitor-discharging current fires the SCR 10, so that the voltage $V_L$ across the fluorescent lamp is clamped to a low level and the lamp cannot be turned on or cannot remain on if it is already on. At the time $t_4$, the source voltage $V_s$ becomes negative and the SCR is off. However, only a small light output may be obtained from the lamp, as shown in FIG. 2B between the times $t_4$ and $t_5$. Thereafter, the lamp may become brightly lit at each half cycle. During the next 5 cycles of the A.C. source, the capacitor 18 is charged to progressively higher levels, the charging occurring only during the positive half cycles of the A.C. source. At time $t_{15}$ the capacitor again achieves the breakdown voltage of the diac and the lamp is again turned off.

FIG. 3 illustrates another flasher circuit, somewhat similar to the circuit of FIG. 1, but with additional portions to provide a more reliable flashing operation. This circuit has a pair of flasher terminals 28, 29 which can be connected across lamp terminals such as $T_3$ and $T_4$ shown in FIG. 1 in place of a starter. The circuit of FIG. 3 includes an SCR 30, diac 32, gate resistor 34, diode 36, and timing capacitor 37, which serve basically the same functions as the corresponding parts 10, 24, 26, 22 and 18, in the circuit of FIG. 1. However, two resistors 38, 40 are employed through which the timing capacitor 37 is charged, and an auxiliary capacitor 42 is provided which is connected across the series connection of one resistor 40 and the timing capacitor 37. In addition, the circuit includes a resistor 44 in series with diode 55, and this combination is connected in parallel with the series connection of a diode 46 and resistor 48. This four element network of two diodes and two resistors is connected between the capacitor 37 and terminal 29, although the flasher circuit can be constructed without any of these elements or with only some of them. The circuit of FIG. 3 provides a voltage across the diac 32 of a form shown in FIG. 4. This helps to assure that the fluorescent lamp will be reliably turned off when the diac fires. In addition a capacitor 50 and resistor 52 are connected across the main terminals 28 and 29 as is often provided for in conventional starters. Another resistor 54 also may be provided to reduce current in the circuit.

One circuit that can be constructed in accordance with the diagram of FIG. 3 to flash a typical 40 watt fluorescent lamp at a rate such as 10 flash-offs per second when connected to a 60 cycle source, utilizes the following component values: Capacitor 18 — 0.1 uf, Capacitor 42 — 0.02 uf, resistor 38 — 1 Megohm (but variable to adjust for a different flash-off frequency), resistor 40 — 1 megohm, resistor 44 — 39 kilohm, resistor 48 — 10 ohm, resistor 34 — 150 ohm, diac 32—Motorola type MPT–28. In addition, the resistance 52 has a value of 150 ohms, the capacitor 50 has a value of 0.1 uf, and the resistor 54 has a value of 20 ohms. Generally, all of the components, with the possible exception of the resistor 54, can be readily installed in a can shown at 70 in FIG. 5. This can is of the same size as that of a typical starter can that contains a typical fluorescent starter circuit. This enables the flasher circuit to be substituted for an ordinary starter when psychedelic effects are desired, and for the ordinary starter to be resubstituted when normal non-flashing illumination is desired. The resistance 54 can be included in the same can, but it generally is subject to considerable heating and provisions are preferably made to allow for greater heat dissipation. Of course, the flasher circuit can be permanently incorporated in a fluorescent fixture that is to be used only in a flashing mode, as may be the case for "black lamp" type installations used primarily to provide an unusual effect.

Thus, the invention provides apparatus for achieving a psychedelic lighting effect largely similar to that previously obtained by high intensity stroboscopic lamps, by employing a flasher circuit that turns off a lamp at a rate such as more than 5 cycles per second, but which turns off the lamp for a minority of the time so that the lamp provides a large average illumination. The invention also provides a simple means for flashing off a fluorescent lamp. While the fluorescent lamp flasher circuit can be employed to flash off the lamp at a high rate to create an effect that is largely similar to that of a briefly flashed stroboscopic lamp, the circuit also can be employed to flash off the lamp at a slower rate, where the blackouts may be noticeable as blackouts that interrupt a primarily on lamp. In some cases, especially where flash-offs are to occur at a slower rate, it may be desirable to turn off the lamp for more than 1 cycle of the A.C. source. This can be accomplished in circuits of the type shown in FIGS. 1 and 3 by constructing them so that the timing capacitor 18 continues to supply current through the diac 24 and the gate of the SCR for more than 1 cycle of the A.C. source. This is often easier to accomplish by using a neon tube in place of the diac 24, inasmuch as some neon tubes can be maintained conductive at a relatively low current level. It may also be noted that a gate resistor such as that shown at 26 and 24 may not be required; its use is well known in the design of SCR circuits.

Although particular embodiments of the invention have been described and illustrated herein, it is recognized that modifications and variations may readily occur to those skilled in the art and consequently, it is intended that the claims be interpreted to cover such modifications and equivalents.

I claim:

1. In combination with a fluorescent-type lamp that is energized from an A.C. source and that has a pair of lamp terminals, a flasher apparatus for repetitively turning off the lamp comprising:

means defining first and second flasher terminals for coupling to said lamp terminals;

controlled switch means having an anode connected to said first flasher terminal, a cathode connected to said second flasher terminal, and a gate said switch means being of a type which is turned on by a voltage supplied to the gate and which thereafter remains on so long as current continues to flow in the same direction between the anode and cathode; and a timing circuit connected to said gate and generating a pulse that turns on said switch means so it thereafter remains on during positive half cycles of said A.C. source, when said first terminal is positive with respect to said second terminal, said timing circuit generating only one pulse during a plurality of cycles of said A.C. source, but generating said pulse during the first half of a positive half cycle, whereby to keep said lamp substantially off for an entire cycle using a simple switch that can clamp the voltage across said lamp only during the positive half of the cycle.

2. Apparatus for use with an ordinary fluorescent lighting fixture, of a type which normally employs a repleaceable starter for starting a lamp that is energized from an A.C. source to provide continuous illumination, to permit rapid conversion of the fixture to a psychedelic flashing device and to permit rapid reconversion back to a condition for providing continuous illumination, comprising:

a case with a pair of terminals for installation in said fluorescent lighting fixture in place of said starter;

controlled rectifier means disposed within said case, with an anode coupled to a first of said terminals on said case, a cathode coupled to a second of said terminals on said case, and a gate for turning on said controlled rectifier means, said rectifier means being of a type which remains on until the anode-to-cathode voltage drops to nearly zero;

a timing capacitor having first and second terminals;

capacitor discharging means including diac means, discharge coupling means coupling said diac means between said first and second terminals of said capacitor through said gate and cathode of said controlled rectifier means, so that when said capacitor reaches the breakdown voltage of said diac means said capacitor discharges to provide gate current that turns on said rectifier means; and a capacitor-charging circuit including a diode and resistance coupling said capacitor across said case terminals to charge the capacitor to the diac breakdown voltage after a plurality of cycles of the A.C. source, said diode oriented to conduct only during the half cycle of the A.C. source when said anode is positive with respect to said cathode, whereby the timing capacitor reaches a diac firing voltage only during said predetermined half cycle of the A.C. source when the controlled rectifier means can clamp the lamp so the lamp is positively held off during the remainder of the half cycle and remains substantially off during the succeeding negative half cycle.

3. The apparatus described in claim 2 wherein:

said resistance includes a first portion connected between said first capacitor terminal and first case terminal and a second portion connected between said second capacitor terminal and second case terminal; and including an auxiliary capacitor connected across the series combination of one of said resistance portions and said timing capacitor, whereby to provide a rapidly rising timing capacitor voltage at the beginning of each positive half cycle to assure firing of the diac and silicon controlled rectifier means at the beginning of the positive half cycle.

4. A flasher circuit for use with a fluorescent lamp that is energized from an A.C. source comprising:

first and second flasher terminals for connection across the terminals of said lamp;

controlled rectifier means having an anode connected to said first flasher terminal, a cathode connected to said second flasher terminal, and a gate, said rectifier being of a type which can be turned on by a current supplied to the gate and which thereafter will remain on so long as current flows from the anode to the cathode;

a timing capacitor;

capacitor charging means including a first and second resistors and a diode connecting said timing capacitor across said flasher terminals, said diode oriented to pass capacitor charging current only during the positive half cycles of the A.C. source when the anode of the rectifier means is positive with respect to the cathode thereof; and capacitor discharging means coupled to said gate, including diac means and means coupling said diac means through said capacitor, so that when said capacitor reaches the breakdown voltage of said diac means said capacitor discharges to provide gate current that turns on said rectifier means;

said capacitor charging means including a resistance between said timing capacitor and second flasher terminal and an auxiliary capacitor connected in parallel with the series connection of the second resistor and said timing capacitor whereby to assure that the controlled rectifier means begins clamping the lamp near the beginning of a positive half cycle.

5. The flasher circuit described in claim 4 wherein:

said capacitor discharging means includes a second diode connected in parallel with said resistance and oriented to conduct current in a direction from said second flasher terminal towards said timing capacitor, whereby to bypass said resistance in discharging the diac means.

* * * * *